(12) United States Patent  
Renshaw

(10) Patent No.: US 6,419,327 B1
(45) Date of Patent: Jul. 16, 2002

(54) WHEEL LINER ATTACHMENT SYSTEM

(75) Inventor: Richard H. Renshaw, Castle Rock, WA (US)

(73) Assignee: Kaper II, Inc., Kelso, WA (US)

(*) Notice: Subject to any disclaimer, the term of this patent is extended or adjusted under 35 U.S.C. 154(b) by 0 days.

(21) Appl. No.: 09/665,553

(22) Filed: Sep. 19, 2000

(51) Int. Cl.$^7$ .............................. B60B 7/14; B60B 7/00
(52) U.S. Cl. .......................... 301/37.376; 301/37.372; 301/37.102
(58) Field of Search ................... 301/37.371, 37.372, 301/37.37, 37.102, 37.106

(56) References Cited

U.S. PATENT DOCUMENTS

| | | | | |
|---|---|---|---|---|
| 4,787,681 A | * | 11/1988 | Wang et al. | ............ 301/37.372 |
| 5,031,965 A | * | 7/1991 | Buerger | ................. 301/37.371 |
| 5,150,949 A | * | 9/1992 | Wang | ..................... 301/37.371 |
| 5,277,478 A | * | 1/1994 | Wright | .................... 301/108.4 |
| 5,494,336 A | * | 2/1996 | Russell | ................... 301/37.372 |
| 5,503,465 A | * | 4/1996 | Price et al. | ............. 301/37.371 |
| 6,254,195 B1 | * | 7/2001 | Plumer | ................... 301/37.372 |

\* cited by examiner

Primary Examiner—S. Joseph Morano
Assistant Examiner—Jason R. Bellinger
(74) Attorney, Agent, or Firm—Edgar W. Averill, Jr.

(57) ABSTRACT

A wheel liner system for attaching a wheel liner to a wheel of a vehicle having a mounting surface and lug nuts engaging lugs adjacent the mounting surface. The wheel liner has an annular peripheral portion with an inner perimeter, and a center portion with a step sidewall extending from the inner perimeter to a plateau having a plurality of holes which receive the lug nuts. The plateau is preferably spaced from the mounting surface to position the plurality of holes adjacent corner portions of the lug nuts, which enables the wheel liner to transitionally contact and support the corner portions of the lug nuts during installation. Preferably the wheel liner is releasably secured to the wheel using a hub cover having a deck portion with at least two apertures and an outer skirt extending below the deck portion. The outer skirt matingly abuts and surrounds the step sidewall of the wheel liner to center the hub cover and the wheel liner relative to each other. Jam nuts are then engaged to the lugs or lug extenders to secure the hub cover against the wheel liner, which in turn secures the wheel liner against the wheel.

16 Claims, 2 Drawing Sheets

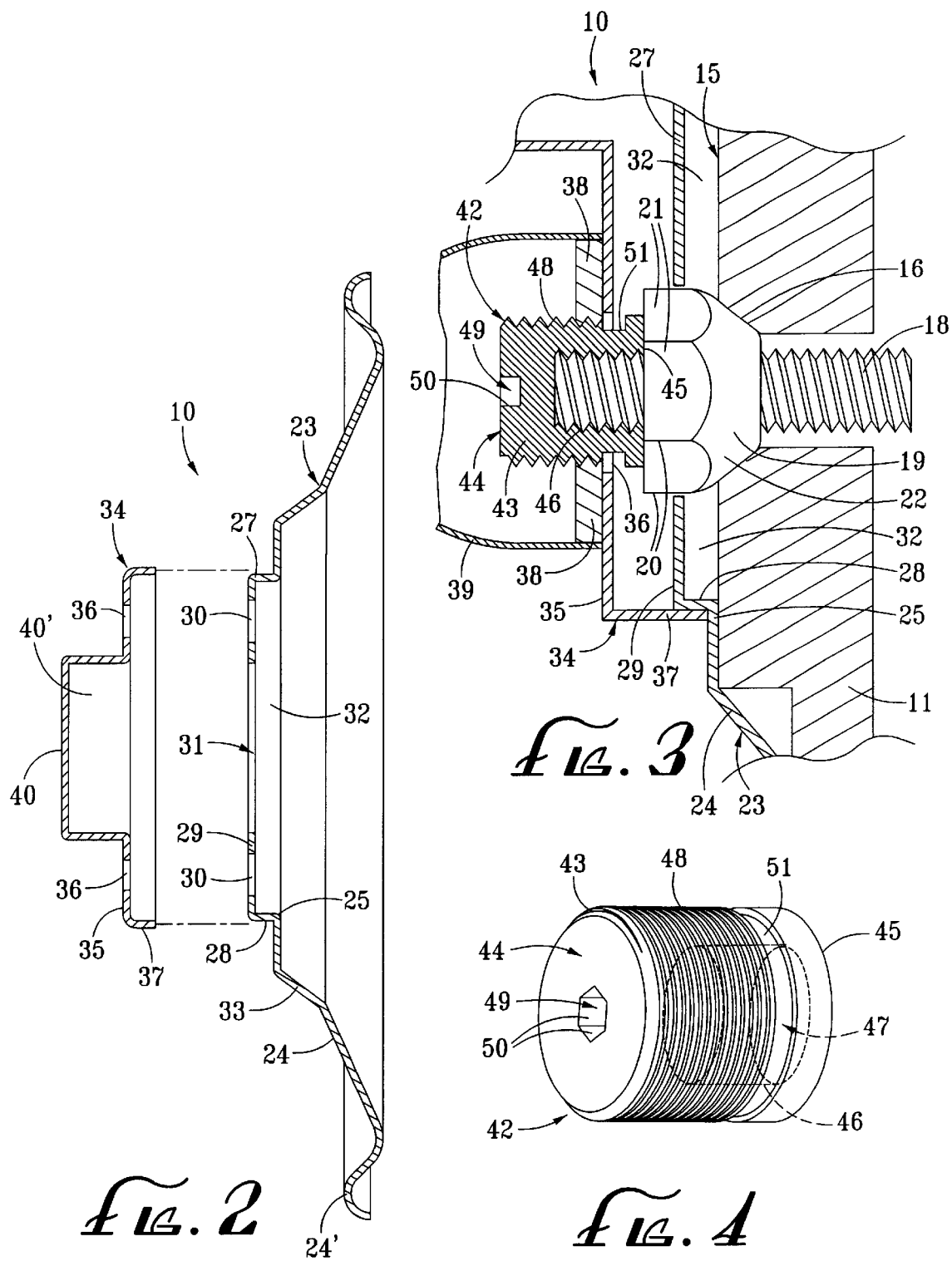

WHEEL LINER ATTACHMENT SYSTEM

BACKGROUND OF THE INVENTION

The field of the invention pertains to wheel cover and trim components. The invention relates more particularly to a system for attaching wheel liners to the wheels of motor vehicles, wherein a centrally-located stepped plateau of a wheel liner centers the wheel liner and hub cover relative to each other, and facilitates centering of the wheel liner relative to the wheel during installation.

Various devices and methods have been utilized to cover the wheels of motor vehicles with wheel liners and other decorative trim components. Typically, truck and motor home wheel liners are secured to a wheel by threadedly engaging the end portions of wheel lugs without having to remove the lug nuts already secured thereon. Where the length of the lug extending beyond the lug nut is insufficient, lug extenders are commonly used to provide the required length. In any case, it is important when attaching wheel trim components that proper centering is achieved relative to the wheel, as well as between wheel liners and supplementary hub covers because unbalanced and otherwise improperly mounted wheel liners and hub covers can be hazardous when driving.

One example of a wheel trim attachment system is shown in U.S. Pat. No. 5,205,616 using stud extenders 16 having internal threads for engaging lugs, external threads for engaging jam nuts 26, and basal mounting plates 30 for seating a trim member 36 thereon. The trim member 36 is secured to the wheel by sandwiching the trim member 36 between the jam nuts 26 and the basal mounting plates 30. In this attachment system the jam nut engages and secures the trim member directly, and is not designed to be used with a supplemental hub cover.

In U.S. Pat. No. 5,286,093 a wheel trim attachment system is shown incorporating a separate hub cover and having a wheel trim with a trim flange frictionally engaging a lug nut. A disadvantage of this arrangement, however, is that it is necessary to form a reverse draw in the trim member. And in U.S. Pat. No. 5,722,735 another wheel trim attachment system is shown having a wheel liner comprising a central plateau, a first incline surrounding and extending below the plateau, and a second incline surrounding the first incline. As shown in FIG. 1, the wheel liner is secured to the wheel by means of lug nuts and an additional annular component having a plurality of holes. The hub cover 36, does not contribute to the attachment of the wheel liner to the wheel. However, the hub cover 36 is centered relative to the wheel liner by means of mounting screws.

BRIEF SUMMARY OF THE INVENTION

It is an object of the present invention to provide a simple, efficient, and cost-effective wheel liner system for attachment to wheels of vehicles.

It is a further object of the present invention to provide a wheel liner system which facilitates centering of the wheel liner relative to the wheel, and to thereby facilitate installation.

It is a still further object of the present invention to provide a wheel liner system capable of centering a wheel liner and an independent hub cap relative to each other.

The present invention is for a wheel liner system for attachment to a wheel of a vehicle having a mounting surface and lugs engaged by lug nuts adjacent to the mounting surface. In a first preferred embodiment, the wheel liner system comprises a wheel liner having an annular peripheral portion with an inner perimeter, and a center portion with a step sidewall extending from the inner perimeter to a plateau having a plurality of holes for receiving the lug nuts. The plateau is preferably spaced from the mounting surface to position the plurality of holes adjacent corner portions of the lug nuts. This enables the corner portions of the lug nuts to transitionally contact and support the wheel liner during installation which facilitates centering of the wheel liner relative to the wheel. In the first preferred embodiment, the wheel liner system further comprises means for releasably securing said wheel liner to said wheel.

In a second preferred embodiment, the wheel liner system also comprises a wheel liner having an annular peripheral portion with an inner perimeter, and a center portion with a step sidewall extending from the inner perimeter to a plateau having a plurality of holes for receiving the lug nuts. Additionally, the wheel liner comprises a hub cover having a deck portion with at least two apertures, and an outer skirt extending below the deck portion. The outer skirt is adapted to matingly and abuttingly surround the step sidewall of the wheel liner whereby the hub cover and the wheel liner are centered relative to each other. Furthermore the wheel liner also comprises means for releasably securing the wheel liner to the wheel. The means for releasably securing is adapted to exert a securing force on the hub cover towards the wheel, which in turn exerts the securing force on the wheel liner against the wheel.

BRIEF DESCRIPTION OF THE DRAWINGS

FIG. 2 is an exploded cross-sectional side view of the wheel liner system illustrating the relationship between the hub cover and the wheel liner.

FIG. 3 is a partly cross-sectional fragmented view of the wheel liner system fully assembled.

FIG. 4 is a perspective view of a lug extender preferably utilized in said wheel liner system.

DETAILED DESCRIPTION OF THE PREFERRED EMBODIMENTS

Figure 1:
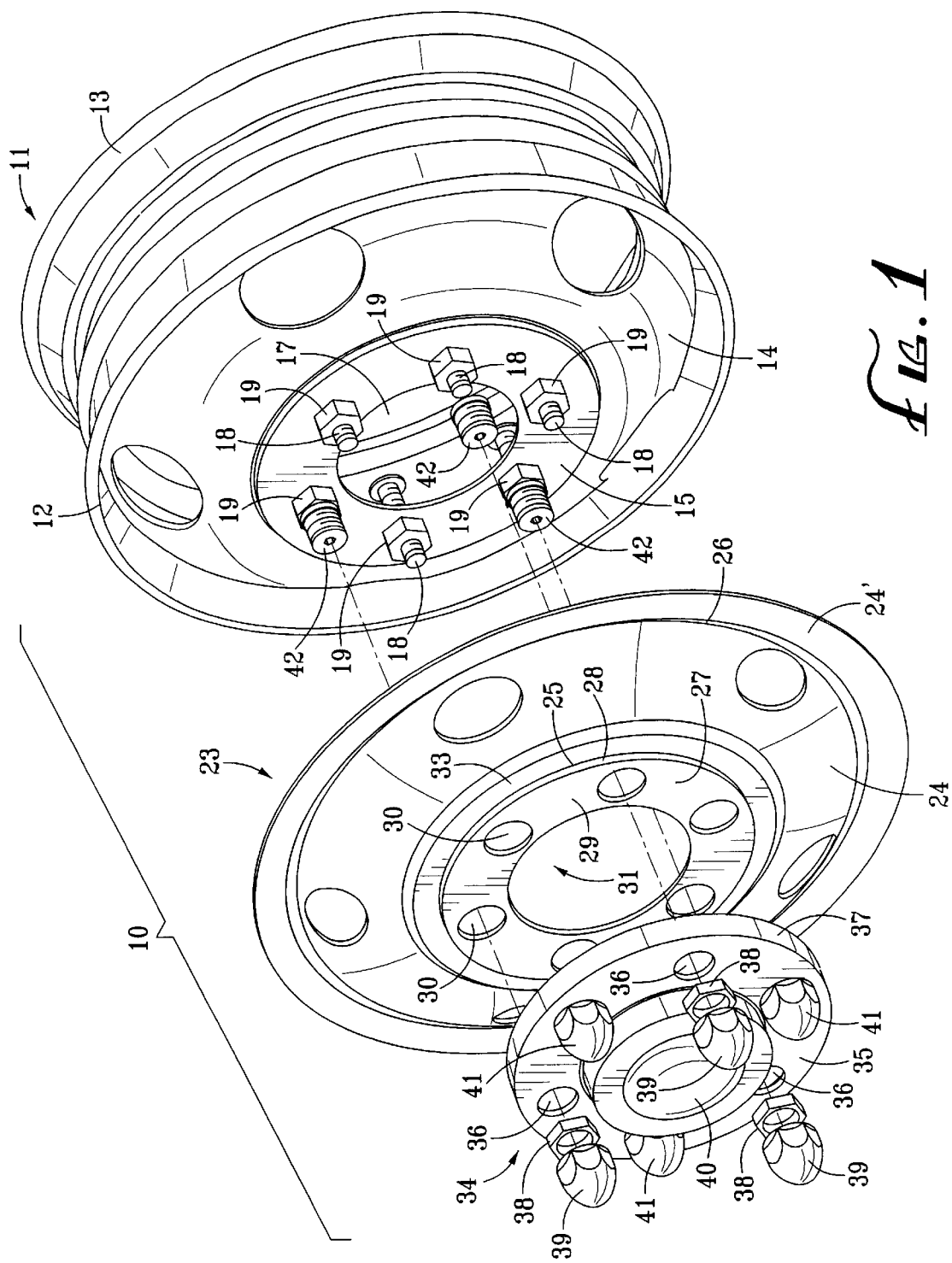
FIG. 1 is an exploded perspective view of the wheel liner system.

Referring now to the drawings, FIGS. 1–4 show the wheel liner system, generally indicated at reference character 10. The wheel liner system 10 is attachable to and for use with a wheel of a vehicle, generally indicated at reference character 11 in FIG. 1. The wheel 11 is preferably that of a truck, or other motor vehicle. As can be seen in FIG. 1, a conventional truck front wheel is shown having an inner rim 13, an outer rim 12, a mounting surface 15 near the outer rim 12, and an annular outer face 14 integrally connecting the mounting surface 15 with the outer rim 12.

As can be seen in FIG. 1, the mounting surface 15 is generally planar and has a central aperture 17 through which an axle may extend (not shown). As can be best seen in FIGS. 1 and 3, the mounting surface 15 has a plurality of holes for receiving threaded wheel lugs 18 which extend therethrough. Furthermore, as per Department of Transportation regulations, each hole is beveled along its rim to form a chamferred surface 16 below the mounting surface 15 for snugly receiving the chamferred portion 22 of a lug nut 19. Above the chamferred portion 22, and consequently also above the mounting surface 15, each lug nut 19 preferably has a conventional hexagonal configuration with six lug surfaces 21 and six corner portions 20. It is notable that while the chamferred portion 22 of the lug nut 19 is contactedly seated against the chamferred surface 16, the lug nut 19 typically does not contact the mounting surface 15; it is rather merely adjacent to it. As can be best seen in FIGS. 1 and 2, the lug nuts 19 threadedly engage the lugs 18 to releasably secure the wheel 11 to the vehicle (not shown).

The wheel liner system 10 comprises a wheel liner, generally indicated at reference character 23 having an annular peripheral portion 24 with an inner perimeter 25 and an outer perimeter 26. preferably, the outer perimeter 17 may be also be adapted as shown in FIGS. 1 and 2, to form a curved rim 24' which mounts to the outer rim 12 of the wheel 11. The wheel liner 23 also has a center portion 27 having a step sidewall 28 extending from the inner perimeter 25 to a plateau 29.

The plateau 29 has a plurality of holes 30 for receiving the lug nuts 19. As can be seen in FIG. 3, while the diameter of the holes 30 is sufficiently wide to receive the lug nuts 19, it is also substantially proximate to prevent extensive relative displacement. Furthermore, the plateau 29 is preferably sufficiently spaced from the mounting surface 15 with a gap 32 to position the plurality of holes 30 adjacent corner portions 20 of the lug nuts 19, and not adjacent the lower chamferred portions 22 which could produce greater relative lateral displacement between the holes 20 and the lug nuts 19. These two features in combination enables the corner portions 20 of the lug nuts 19 to transitionally contact and support the wheel liner 23, to thereby keep it centered and aligned during installation and assembly. This is particularly useful for preventing thin-walled wheel liners from slipping into the chamferred portions 22 of the lug nuts 19. It is notable that the term "plateau" is not limited to planar configurations; rather it can be any surface at a generally transverse angle from the step sidewall. It is further notable that the plateau 29 shown in FIGS. 1 and 2 preferably has a central aperture 31 similar to the aperture 17 of the wheel 11, for receiving the axle (not shown).

And as can be best seen in FIGS. 2 and 3, the step sidewall 28 preferably has a cylindrical configuration which extends parallel to a central axis of rotation (not shown) of said wheel liner 23, although it is not limited only to such. Alternatively, the step sidewall 28 can have a frusto-conical or other configuration capable of matingly and abuttingly receiving a hub cover 34, as will be discussed in detail below.

As can be seen in FIGS. 1–3, the wheel liner system 10 preferably also includes a hub cover 34 having a deck portion 35 with at least two apertures 36, and an outer skirt 37 extending below the deck portion 35. The outer skirt 37 is adapted to matingly and abuttingly surround the step sidewall 28 of the wheel liner 23. This arrangement effectively aligns and centers the hub cover 34 and the wheel liner 23 relative to each other. Additionally, as shown in the figures, the hub cover 34 may also include an axle pocket 40 extending above the deck portion 35. The axle pocket 40 encloses an axle cavity 40' for receiving and covering the wheel axle (not shown).

Furthermore, the hub cover 34 is preferably utilized to secure the wheel liner 23 to the wheel 11. The at least two apertures 36 (three shown in FIG. 1) are adapted to receive lug extenders, generally indicated at reference character 42. As can be best seen in FIG. 4, each lug extender 42 has a cylindrical configuration with a threaded inner surface 46, a threaded outer surface 48, an open lower end 45 for threadedly receiving a corresponding lug 18 therethrough, and an upper end 43 with a top surface 44 extending through a corresponding one of the at least two apertures 36 and above the deck portion 35 of the hub cover 34. Each lug extender 42 also includes surface means 49 for receiving a rotating pressure thereon from a fastening tool for securing the lug extender 42 to the corresponding lug 18. The surface means 49 is preferably a female hexagonal socket 49 having six surfaces 50 at the top surface 44, which is adapted to matingly receive a male hexagonal tool, not shown.

At least two jam nuts 38 are adapted to threadedly engage the threaded outer surface 48 of the at least two lug extenders 42. The jam nuts 38 exert a securing force on the deck portion 35 of the hub cover 34, which in turn is exerted on the plateau 29 of the wheel liner 23 against the wheel 11. Furthermore, as shown in FIG. 3, each lug extender 42 preferably has a thread release 51 near the open lower end 45 to prevent crushing the hub cover 34. In this manner, jam nuts 38 are threadedly engaged to the lug extenders 42 to secure the hub cover 34 against the wheel liner 23, which in turn secures the wheel liner 23 against the wheel 11. Thus, it can be seen that the central portion 27 with the stepped plateau 29 enables a single jam nut to align and join the hub cover 34 to the wheel liner 23. It is notable that while lug extenders 42 are preferably utilized as shown in the preferred embodiment, for sufficiently long lugs 18 which extend beyond the deck portion 35 of the hub cover 34, jam nuts 38 may be threadedly engaged directly to the lugs 18 to provide the securing force.

Finally, as can be seen in FIGS. 1 and 3, detachable jam nut covers 39 are provided to frictionally attach to the jam nuts 38. Since at a minimum only two lug extenders 42 need be provided to releasably secure the hub cover 34 to the wheel liner 23, only an equal number of detachable jam nut covers 38 is required (three shown in FIG. 1). And as can be best seen in FIG. 1, the hub cover 34 includes lug covers 41 integrally formed on the deck portion 35 of the hub cover 34, and having the same or similar shape and design as the jam nut covers 38.

In is notable that the wheel liner system, including the wheel liner 23, hub cover 34, and jam nut covers 39, are preferably composed of lightweight sheets of metal or metal alloy, which is capable of easily and cost-effectively being manufactured by conventional manufacturing methods. The lug extenders 42 are preferably composed of steel or other rigid and durable metal also manufacturable by conventional methods well known in the relevant art.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A wheel liner system for attachment to a wheel having a mounting surface and lugs engaged by lug nuts adjacent said mounting surface, said wheel liner system comprising:

a wheel liner having an annular peripheral portion with an inner perimeter, and a center portion with a step sidewall extending from said inner perimeter to a plateau having a plurality of holes for receiving said lug nuts, said plateau spaced from said mounting surface to position said plurality of holes adjacent corner portions of said lug nuts;

means for releasably securing said wheel liner to said wheel, further comprising a hub cover having a deck portion with at least two apertures, and an outer skirt extending below said deck portion, said outer skirt adapted to matingly and abuttingly surround said sidewall of said wheel liner whereby said hub cover and said wheel liner are centered relative to each other; and wherein said means for releasably securing said wheel liner to said wheel exerts a securing force on said hub cover towards said wheel which in turn exerts said securing force on said wheel liner against said wheel.

2. The wheel liner system as in claim 1, wherein said means for releasably securing said wheel liner to said wheel comprises:
- at least two lug extenders, each having a cylindrical configuration with threaded inner and outer surfaces, an open lower end for threadedly receiving a corresponding lug therethrough, an upper end extending through a corresponding one of said at least two apertures and above the deck portion of said hub cover, and surface means for receiving a rotating pressure thereon from a fastening tool; and
- at least two jam nuts adapted to threadedly engage the threaded outer surface of said at least two lug extenders at the upper ends thereof, whereby said at least two jam nuts exert the securing force on the deck portion of said hub cover.

3. The wheel liner system as in claim 2, wherein said surface means for receiving a rotating pressure thereon is a hexagonal female opening at the upper end of a corresponding lug extender for matingly receiving a hexagonal male tool.

4. A wheel liner system as in claim 2, wherein said at least two lug extenders have thread release surfaces thereon.

5. The wheel liner system as in claim 2, further comprising at least two jam nut covers adapted to frictionally attach to said at least two jam nuts.

6. The wheel liner system as in claim 1, wherein said plateau is normal to a central axis of rotation of said wheel liner.

7. The wheel liner system as in claim 1, wherein said step sidewall has a cylindrical configuration extending parallel to a central axis of rotation of said wheel liner.

8. A wheel liner system for attachment to a wheel having a mounting surface and lugs engaged by lug nuts adjacent said mounting surface, said wheel liner system comprising:
- a wheel liner having an annular peripheral portion with an inner perimeter, and a center portion with a step sidewall extending from said inner perimeter to a plateau having a plurality of holes for receiving said lug nuts;
- a hub cover having a deck portion with at least two apertures, and an outer skirt extending below said deck portion, said outer skirt adapted to matingly and abuttingly surround said step sidewall of said wheel liner whereby said hub cover and said wheel liner are centered relative to each other; and
- means for releasably securing said wheel liner to said wheel, said means for releasably securing adapted to exert a securing force on said hub cover towards said wheel which in turn exerts said securing force on said wheel liner against said wheel.

9. The wheel liner system as in claim 8, wherein said means for releasably securing said wheel liner to said wheel comprises:
- at least two lug extenders, each having a cylindrical configuration with threaded inner and outer surfaces, an open lower end for threadedly receiving a corresponding lug therethrough, an upper end extending through a corresponding one of said at least two apertures and above the deck portion of said hub cover, and surface means for receiving a rotating pressure thereon from a fastening tool; and
- at least two jam nuts adapted to threadedly engage the threaded outer surface of said at least two lug extenders at the upper ends thereof, whereby said at least two jam nuts exert the securing force on the deck portion of said hub cover.

10. The wheel liner system as in claim 9, wherein said surface means for receiving a rotating pressure thereon is a hexagonal female opening at the upper end of a corresponding lug extender for matingly receiving a hexagonal male tool.

11. A wheel liner system as in claim 9, wherein said at least two lug extenders have thread release surfaces thereon.

12. The wheel liner system as in claim 9, further comprising at least two jam nut covers adapted to frictionally attach to said at least two jam nuts.

13. The wheel liner system as in claim 8, wherein said plateau is spaced from said mounting surface to position said plurality of holes adjacent corner portions of said lug nuts.

14. The wheel liner system as in claim 8, wherein said plateau is normal to a central axis of rotation of said wheel liner.

15. The wheel liner system as in claim 8, wherein said plateau has a central aperture for receiving a hub of said wheel.

16. The wheel liner system as in claim 8, wherein said step sidewall has a cylindrical configuration extending parallel to a central axis of rotation of said wheel liner.

* * * * *